US009386029B2

(12) United States Patent
Pham et al.

(10) Patent No.: US 9,386,029 B2
(45) Date of Patent: Jul. 5, 2016

(54) METHOD AND SYSTEM FOR TRACKING FRAUDULENT ACTIVITY

(71) Applicant: PayPal, Inc., San Jose, CA (US)

(72) Inventors: Quang D. Pham, San Jose, CA (US); Mathew Gene Henley, Campbell, CA (US); Andrew Millard Brown, Mountain View, CA (US); Jeremy B. Edberg, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 45 days.

(21) Appl. No.: 14/244,418

(22) Filed: Apr. 3, 2014

(65) Prior Publication Data
US 2014/0215626 A1 Jul. 31, 2014

Related U.S. Application Data

(63) Continuation of application No. 10/923,064, filed on Aug. 20, 2004, now Pat. No. 8,914,309.

(51) Int. Cl.
*G06F 21/00* (2013.01)
*H04L 29/06* (2006.01)
*G06Q 20/40* (2012.01)

(52) U.S. Cl.
CPC ........ *H04L 63/1408* (2013.01); *G06Q 20/4016* (2013.01); *H04L 63/14* (2013.01); *H04L 63/1483* (2013.01)

(58) Field of Classification Search
CPC .................................................. G06Q 20/382
USPC .......... 726/1, 5, 22; 705/50–79, 14.26, 14.47; 455/410
See application file for complete search history.

(56) References Cited

U.S. PATENT DOCUMENTS

| 5,706,507 | A | 1/1998 | Schloss |
| 5,835,712 | A | 11/1998 | DuFresne |
| 6,092,194 | A | 7/2000 | Touboul |
| 6,286,001 | B1 | 9/2001 | Walker et al. |
| 6,321,267 | B1 | 11/2001 | Donaldson |
| 6,510,458 | B1 | 1/2003 | Berstis et al. |
| 6,604,131 | B1 | 8/2003 | Warris et al. |
| 6,874,084 | B1 | 3/2005 | Dobner et al. |

(Continued)

OTHER PUBLICATIONS

"U.S. Appl. No. 10/883,454, Advisory Action mailed Jun. 10, 2008", 3 pgs.

(Continued)

*Primary Examiner* — James A Reagan
(74) *Attorney, Agent, or Firm* — Schwegman Kundberg & Woessner, P.A.

(57) ABSTRACT

A method and system for tracking potentially fraudulent activities associated with one or more web sites is disclosed. The system includes a fraud tracking server connected to a fraud tracking database. The fraud tracking server includes a communications module to facilitate the exchange of data between the server and multiple client devices. The fraud tracking server receives data from one or more client devices that identifies a potential spoof site. The fraud tracking server also includes control logic to generate a spoof site tracking record in the fraud tracking database. The spoof site tracking record includes the data identifying the potential spoof site. After the spoof site tracking record has been created, the fraud tracking server notifies an administrator of the potential spoof site by communicating the data received and stored in the fraud tracking database to an administrator.

20 Claims, 7 Drawing Sheets

(56) References Cited

U.S. PATENT DOCUMENTS

| | | | |
|---|---|---|---|
| 7,068,190 B2 | 6/2006 | Satomi et al. | |
| 7,606,821 B2 | 10/2009 | Leahy et al. | |
| 7,665,140 B2 | 2/2010 | Oliver et al. | |
| 7,769,737 B2 | 8/2010 | Leahy et al. | |
| 7,930,284 B2 | 4/2011 | Leahy et al. | |
| 8,914,309 B2 | 12/2014 | Pham et al. | |
| 2002/0016910 A1 | 2/2002 | Wright et al. | |
| 2003/0097593 A1 | 5/2003 | Sawa et al. | |
| 2003/0163714 A1 | 8/2003 | Nortung | |
| 2004/0078422 A1 | 4/2004 | Toomey | |
| 2004/0123157 A1 | 6/2004 | Alagna et al. | |
| 2005/0257261 A1* | 11/2005 | Shraim | G06Q 10/107 726/22 |
| 2006/0021031 A1 | 1/2006 | Leahy et al. | |
| 2006/0041508 A1 | 2/2006 | Pham et al. | |
| 2006/0089978 A1 | 4/2006 | Lee et al. | |
| 2006/0265747 A1 | 11/2006 | Judge | |
| 2007/0101423 A1 | 5/2007 | Oliver et al. | |
| 2008/0028465 A1* | 1/2008 | Bantz | H04L 63/1475 726/22 |
| 2008/0040802 A1 | 2/2008 | Pierson et al. | |
| 2010/0017865 A1 | 1/2010 | Leahy et al. | |
| 2010/0269161 A1 | 10/2010 | Leahy et al. | |

OTHER PUBLICATIONS

"U.S. Appl. No. 10/883,454, Examiner Interview Summary mailed Dec. 18, 2007", 2 pgs.

"U.S. Appl. No. 10/883,454, Final Office Action mailed Apr. 21, 2008", 12 pgs.

"U.S. Appl. No. 10/883,454, Non Final Office Action mailed Mar. 23, 2007", 12 pgs.

"U.S. Appl. No. 10/883,454, Non Final Office Action mailed Sep. 20, 2007", 8 pgs.

"U.S. Appl. No. 10/883,454, Non-Final Office Action mailed Nov. 17, 2008", 8 pgs.

"U.S. Appl. No. 10/883,454, Notice of Allowance mailed Jun. 11, 2009", 4 pgs.

"U.S. Appl. No. 10/883,454, Response filed Feb. 17, 2009 mailed Nov. 17, 2008", 9 pgs.

"U.S. Appl. No. 10/883,454, Response filed Jun. 3, 2008 to Final Office Action mailed Apr. 21, 2008", 8 pgs.

"U.S. Appl. No. 10/883,454, Response filed Jun. 22, 2007 to Non Final Office Action mailed Mar. 23, 2007", 24 pgs.

"U.S. Appl. No. 10/883,454, Response filed Jul. 21, 2008 to Advisory Action mailed Jun. 10, 2008", 9 pgs.

"U.S. Appl. No. 10/883,454, Response filed Dec. 20, 2007 to Non-Final Office Action mailed Sep. 20, 2007", 15 pgs.

"U.S. Appl. No. 10/923,064, Advisory Action mailed Feb. 26, 2010", 2 pgs.

"U.S. Appl. No. 10/923,064, Final Office Action mailed Jan. 30, 2009", 18 pgs.

"U.S. Appl. No. 10/923,064, Final Office Action mailed May 12, 2011", 24 pgs.

"U.S. Appl. No. 10/923,064, Final Office Action mailed Dec. 11, 2009", 22 pgs.

"U.S. Appl. No. 10/923,064, Non Final Office Action mailed May 10, 2013", 24 pgs.

"U.S. Appl. No. 10/923,064, Non Final Office Action mailed Dec. 3, 2010", 27 pgs.

"U.S. Appl. No. 10/923,064, Non-Final Office Action mailed May 1, 2008", 18 pgs.

"U.S. Appl. No. 10/923,064, Non-Final Office Action mailed May 14, 2009", 19 pgs.

"U.S. Appl. No. 10/923,064, Notice of Allowance mailed Feb. 10, 2014", 15 pgs.

"U.S. Appl. No. 10/923,064, Preliminary Amendment filed Mar. 3, 2005", 5 pgs.

"U.S. Appl. No. 10/923,064, Response filed Aug. 14, 2009 to Non Final Office Action mailed May 14, 2009", 13 pgs.

"U.S. Appl. No. 10/923,064, Response filed Feb. 11, 2010 to Final Office Action mailed Dec. 11, 2009", 12 pgs.

"U.S. Appl. No. 10/923,064, Response filed Mar. 3, 2011 to Non Final Office Action mailed Dec. 3, 2010", 13 pgs.

"U.S. Appl. No. 10/923,064, Response filed Mar. 30, 2009 to Final Office Action mailed Jan. 30, 2009", 15 pgs.

"U.S. Appl. No. 10/923,064, Response filed Aug. 12, 2011 to Final Office Action mailed May 12, 2011", 12 pgs.

"U.S. Appl. No. 10/923,084, Response filed Oct. 10, 2013 to Non Final Office Action mailed May 10, 2013", 13 pgs.

"U.S. Appl. No. 10/923,064, Response filed Nov. 3, 2008 to Non-Final Office Action mailed May 1, 2008", 27 pgs.

"U.S. Appl. No. 12/568,589, Notice of Allowance mailed Mar. 23, 2010", 10 pgs.

"U.S. Appl. No. 12/568,589, Preliminary Amendment filed Feb. 26, 2010", 3 pgs.

"U.S. Appl. No. 12/830,209, Notice of Allowance mailed Dec. 9, 2010", 11 pgs.

"U.S. Appl. No. 12/830,209, Preliminary Amendment filed Nov. 15, 2010", 3 pgs.

"U.S. Appl. No. 10/923,064, Corrected Notice of Allowance mailed Sep. 25, 2014", 4 pgs.

"U.S. Appl. No. 10/923,064, Notice of Allowability mailed Sep. 9, 2014", 2 pgs.

* cited by examiner

SPOOF SITE TRACKING RECORD 84

| | | |
|---|---|---|
| 86 | SPOOF URL | http://www.ibay.com |
| 88 | IP ADDRESS | 212.2.56.8 |
| 90 | ISP CONTACT INFO | AOL Fraud Department Somwhere, VA 12345 |
| 92 | DATE REPORTED | 02/25/2004 |
| 94 | DATE VERIFIED | 020/25/2004 |
| 96 | COPY OF SOURCE CODE | !@#$!@#$@!#$ |
| 98 | SCREENSHOT | @!#$@#$%@#$% |
| 100 | DATE "FIRST TAKE DOWN NOTICE" WAS SENT | 02/25/2004 |
| 102 | DATE "SECOND TAKE DOWN NOTICE" WAS SENT | 03/25/2004 |
| 104 | CASE NOTES | --- |
| 106 | RESPONSE 1 FROM ISP | --- |
| 108 | LOGS FROM ISP | --- |

FIG. 5

METHOD AND SYSTEM FOR TRACKING FRAUDULENT ACTIVITY

This application is a continuation of U.S. application Ser. No. 10/923,064 filed Aug. 20, 2004, which application is incorporated in their entirety herein by reference.

FIELD OF THE INVENTION

Exemplary embodiments of present invention relate generally to the field of fraud prevention and, in one exemplary embodiment, to methods and systems for tracking fraudulent activities related to spoof sites in a network-based commerce system.

BACKGROUND OF THE INVENTION

The number of people purchasing products (goods and/or services) and executing financial transactions via the Internet has increased significantly over the course of the last several years. Many online enterprises have managed to attract and retain large customer bases resulting in significant growth and financial success. However, many successful online enterprises have not only drawn the attention of new customers, but they have also attracted unscrupulous persons seeking to defraud others.

One of the more common scams practiced by fraud perpetrators is referred to as "phishing." Phishing involves sending an email to the users of a legitimate online enterprise and directing the users to visit a web site where they are asked to update personal information, such as passwords and/or credit card numbers, social security numbers, and bank account numbers, or any other number that may, or may not, already be on record with the legitimate enterprise. Both the email and the web site to which the user is directed are "spoofed." That is, the email and the web site, commonly referred to as a spoof site, are purposefully designed to look as if they are from, or associated with, the legitimate online enterprise. However, in reality, the purpose of the phishing email is to direct the user to the spoof site, which exists for the sole purpose of stealing the user's personal information.

In a typical phishing scam, the perpetrator will target a large number of users of a large and well-established online enterprise, knowing that only a small percentage of the targeted users will actually provide the requested personal information. Once the perpetrator has stolen a user's personal information, the perpetrator can use that information fraudulently to the perpetrator's benefit. For example, the perpetrator may access the user's account at the online enterprise and enter into fraudulent transactions. For example, the fraudulent transaction may be for goods and/or services in an online commerce system (e.g., in a fixed price or an auction environment). Alternatively, the perpetrator may attempt to transfer money from one of the user's accounts to another account held by the perpetrator (e.g., in an online banking environment). When the user finally realizes his mistake in furnishing his/her personal information, typically it is too late as the negative consequences have already occurred.

Fraudulent activities, and phishing scams in particular, are a problem for online enterprises for a variety of reasons. One obvious problem related to these scams is the effect they have on consumer trust. Because online transactions are entirely automated and generally lack any person-to-person interaction, consumer trust is particularly important to online enterprises.

In addition, a large online enterprise frequently targeted by phishing scams must dedicate significant resources to dealing with the problems that arise as the result of such scams. For example, an online enterprise may employ several people to answer customer calls and investigate customer complaints resulting from phishing scams.

SUMMARY OF THE DESCRIPTION

A method and system for tracking fraudulent activity are provided. According to one embodiment of the present invention, a fraud tracking database is connected to a fraud tracking server. The fraud tracking server includes a communications module to receive data identifying a potential spoof site. For example, the communications module may receive an email containing the URL of a document associated with a suspected spoof site. The fraud tracking server also includes control logic to generate a spoof site tracking record in the fraud tracking database. The spoof site tracking record may, for example, include data that identifies the potential spoof site, such as a URL received via email. Finally, after generating the spoof site tracking record, the communications module of the fraud tracking server may notify an administrator of the potential spoof site, for example, by communicating the data identifying the potential spoof site to an administrator for review.

Other aspects of the present invention will be apparent from the accompanying figures and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 illustrates a spoof site tracking record, in accordance with one exemplary embodiment of the invention;

DETAILED DESCRIPTION

A method and system for tracking fraudulent activity are described. In the following description, for purposes of explanation, numerous specific details are set forth in order to provide a thorough understanding of the present invention. It will be evident, however, to one skilled in the art that the present invention may be practiced without these specific details.

One exemplary embodiment of the present invention provides a method and system for tracking fraudulent activities, including fraudulent activities associated with spoof web sites. In particular, one embodiment of the invention automates many of the tasks associated with identifying, analyzing, monitoring, and reporting fraudulent activities associated with one or more web sites (e.g., spoof sites). Because it automates many of the tasks involved in the day-to-day operations of an online enterprise, the present invention may free up resources that can be directed to other important tasks.

Figure 1:
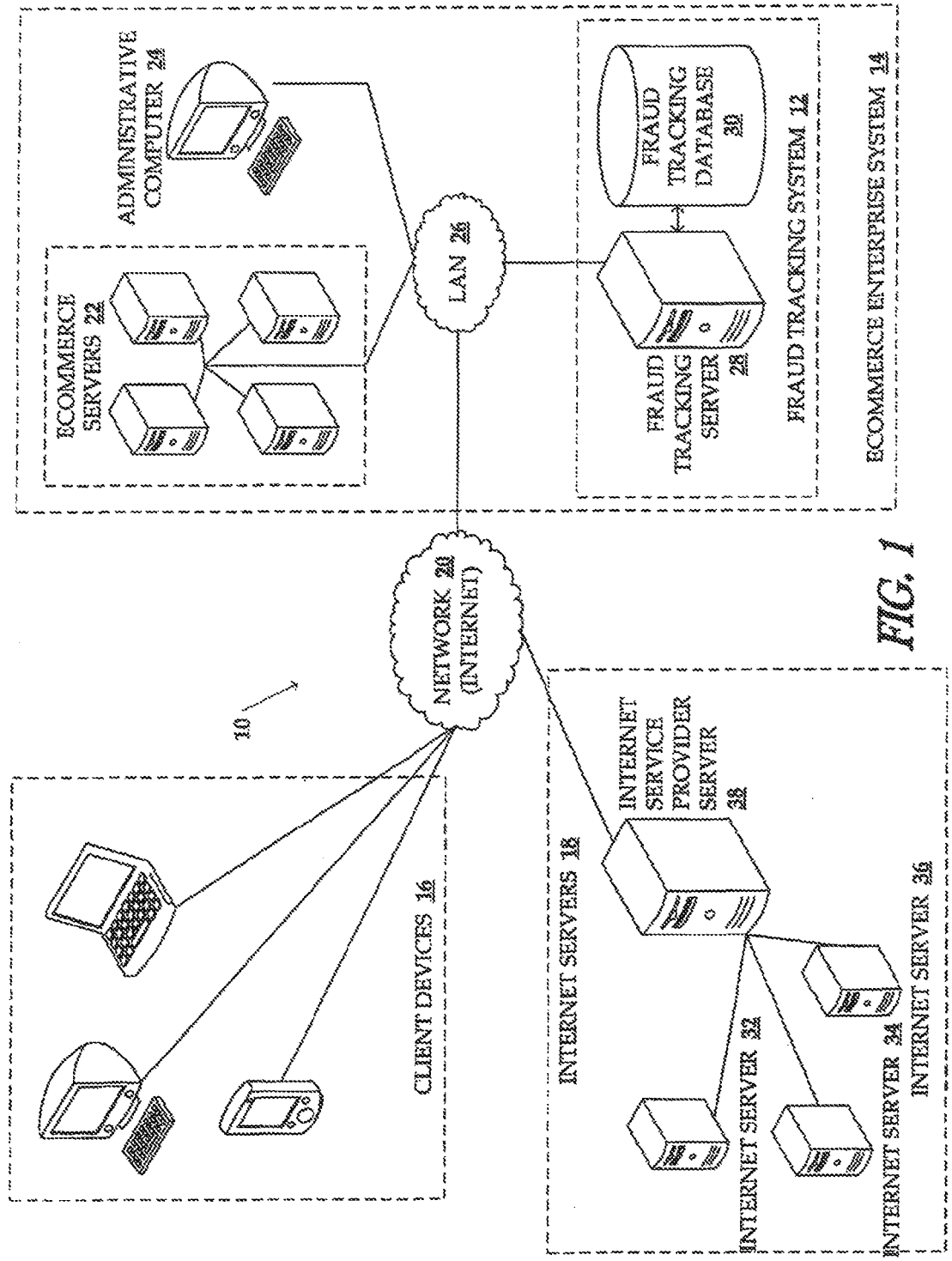
FIG. 1 illustrates a network environment including an exemplary embodiment of a fraud tracking system, in accordance with the invention, that is local to an eCommerce enterprise system.

FIG. 1 illustrates a network environment 10 including an exemplary embodiment of a fraud tracking system 12, in accordance with the invention, that is shown by way of example to be local to an eCommerce enterprise system 14. The network environment 10 illustrated in FIG. 1 includes a plurality of exemplary client devices 16 connected to Internet servers 18 and the eCommerce enterprise system 14 via a network 20. For example, the network 20 may be a wide area network, such as the Internet.

As illustrated in FIG. 1, the eCommerce enterprise system 14 may include the fraud tracking system 12, as well as several exemplary eCommerce servers 22 interconnected with an administrative computer 24 by a local area network (LAN) 26. The eCommerce servers 22 may include any one or more servers that are used in a backend server environment of an online enterprise, including (but not limited to): email servers, database servers, application servers, application programming interface servers, and web document servers. In one exemplary embodiment, the fraud tracking system 12 includes a fraud tracking server 28 connected to a fraud tracking database 30. In one embodiment of the invention, the administrative computer 24 may be used to administer one or more of the servers that make up the eCommerce enterprise system 14, including one of the eCommerce servers 22 or the fraud tracking server 28.

The Internet servers 18 may include Internet server 32, 34 and 36 and each of the individual Internet servers 32, 34 and 36 illustrated in FIG. 1 may be connected to the network 20 (e.g., the Internet) via an Internet Service Provider (ISP) server 38. Consequently, each of the individual Internet servers 32, 34 and 36 may be assigned an Internet Protocol (IP) address that is within a particular range of addresses that the ISP server 38 is authorized and configured to assign. For example, ISP server 38 may represent one of many AOL® servers used by AOL® customers to connect to the Internet. As such, ISP server 38 may be configured to dynamically, or statically, assign IP addresses to Internet servers 32, 34 and 36 from a pre-set range of IP addresses. It will be appreciated that the Internet servers 18 illustrated in FIG. 1 represent only one exemplary configuration of Internet servers, and that many variations to the configuration shown are possible.

Each of the client devices 16 illustrated in FIG. 1 may be capable of executing a client application that facilitates the browsing of documents hosted and served by one of the Internet servers 18, or one of the eCommerce servers 22 of the eCommerce enterprise system 14. For example, the client application may be a standard web browser application, such as Microsoft Internet Explorer®. By entering a Universal Resource Locator (URL) into the address bar of the web browser application, a user is able to download and view documents that are served by one of the individual Internet servers 32, 34, 36 and/or one of the eCommerce servers 22, In addition, each client device 16 may be capable of executing a client application that facilitates the sending and receiving of email.

In one embodiment of the invention, the fraud tracking server 28 receives data that identifies a potential spoof site and generates a record or spoof site tracking record in the fraud tracking database 30 before notifying an administrator of the potential spoof site. For example, using a web browsing application on one of the client devices 16, a user may download and view a document from one of the Internet servers 32, 34 or 36 that looks suspicious (e.g., that at least appears to be fraudulent). For example, the web document may look as if it is mimicking a document or web page that is hosted by one of the eCommerce servers 22 of the eCommerce enterprise system 14. The user may report the suspicious looking web document to the fraud tracking system 12 of the eCommerce enterprise 14 by sending an email including the URL of the suspicious looking web document to the eCommerce enterprise system 14. Accordingly, in one exemplary embodiment of the invention, the fraud tracking server 28 may receive email identifying a potentially fraudulent web document, automatically extract the URL from the email, and generate a spoof site tracking record in the fraud tracking database 30. It will however be appreciated that the record generated and stored in the fraud tracking database 30 may vary from one embodiment of the invention to another.

Figure 2:
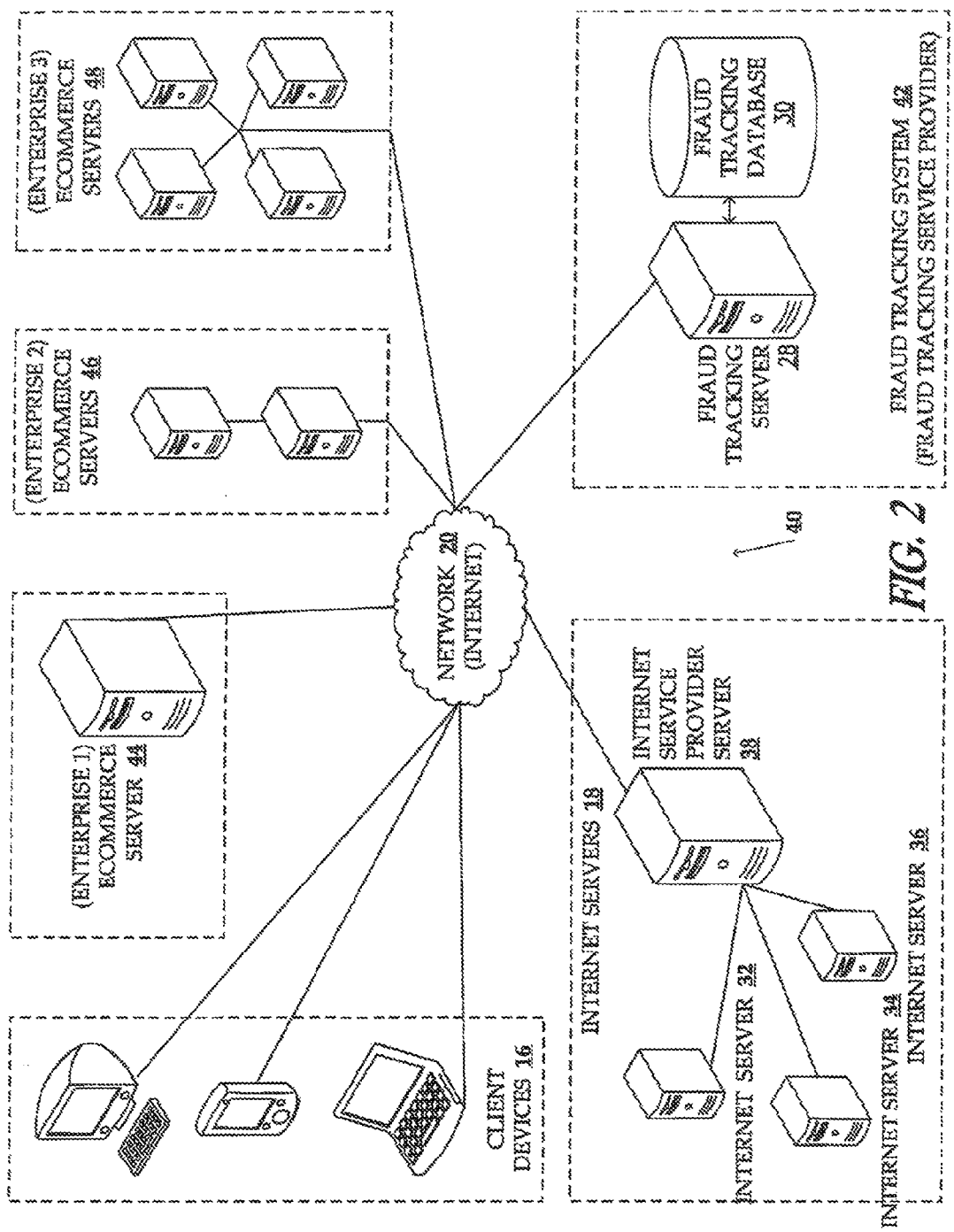
FIG. 2 illustrates a network environment including an alternative embodiment of a fraud tracking system, also in accordance with the invention, implemented for use by a fraud tracking service provider.

FIG. 2 illustrates an exemplary network environment 40 including an exemplary embodiment of a fraud tracking system 42, also in accordance with the invention, implemented for use by a fraud tracking service provider. The network environment 40 illustrated in FIG. 2 is similar to that of FIG. 1, with the exception that the fraud tracking system 42 of FIG. 2 is implemented as a standalone system and is configured to track spoof sites for multiple eCommerce enterprises. For example, consistent with the exemplary embodiment of the invention illustrated in FIG. 2, the fraud tracking system 42 may track spoof sites for eCommerce servers 44, 46 and 48 associated with enterprise 1, enterprise 2 and enterprise 3, respectively. It will be appreciated that any number of eCommerce servers associated with any number of enterprises may be monitored. This particular exemplary embodiment of the invention may allow each of the enterprises 1, 2 and 3 to offload some of the tasks associated with tracking and managing fraudulent activities to a fraud tracking service provider. The fraud tracking service provider, in turn, may charge a fee for its services.

Figure 3:
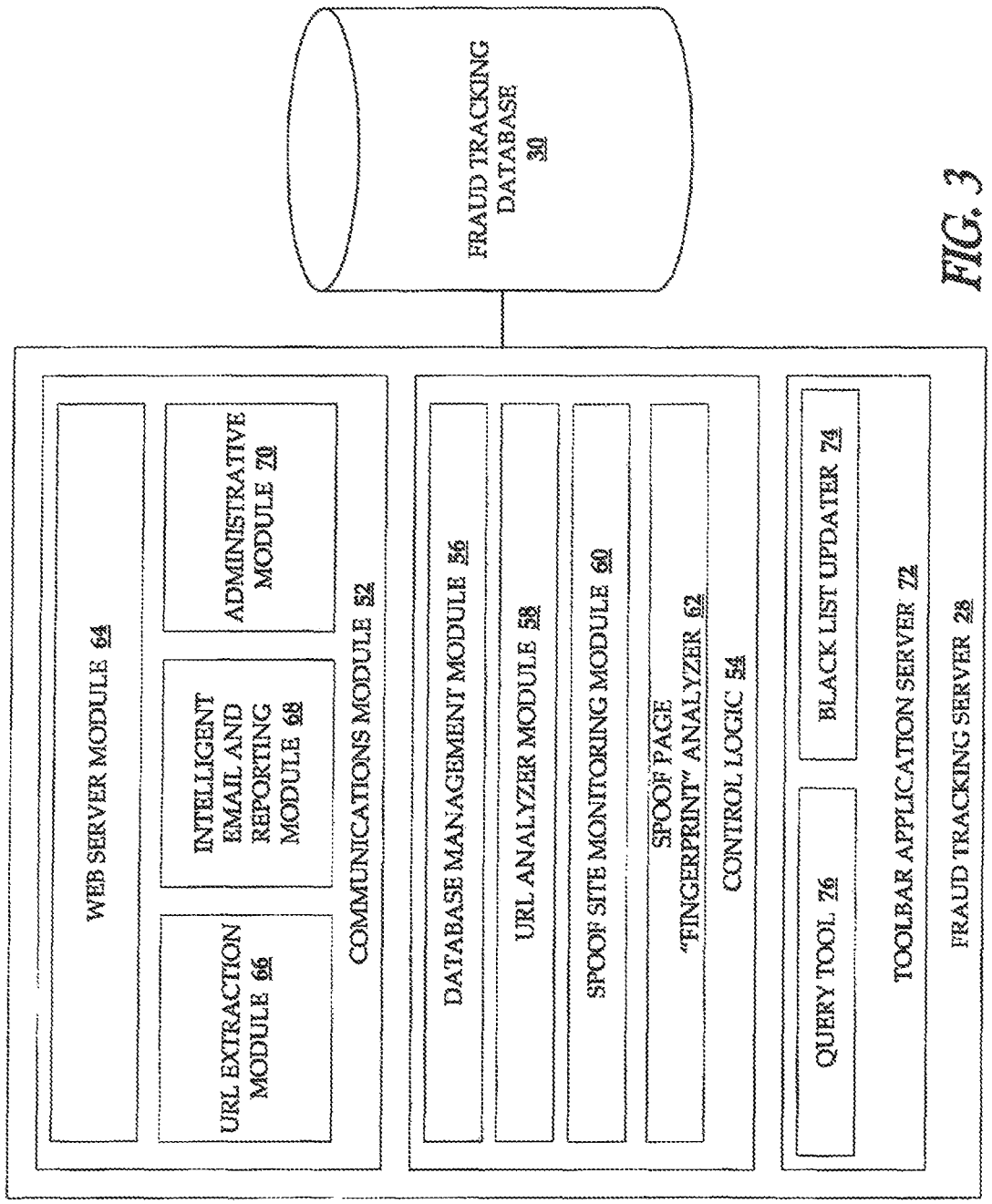
FIG. 3 is a block diagram of one embodiment of a fraud tracking system including a fraud tracking server and a fraud tracking database, both in accordance with the invention.

FIG. 3 is a block diagram of one embodiment of the fraud tracking system 12 including the fraud tracking server 28 and the fraud tracking database 30.

In FIG. 3, the fraud tracking database 30 is illustrated as a single component, separate from the fraud tracking server 28. However, it will be appreciated by those skilled in the art that the fraud tracking database 30 may be implemented in a variety of configurations. For example, the fraud tracking database 30 may be part of a separate computing device, or alternatively, the fraud tracking database 30 may be a sub-component of the fraud tracking server 28.

The fraud tracking server 28 may include two primary components: a communications module 52, and control logic 54. The control logic 54, as the name suggests, may control the various functions of the fraud tracking server 28. In one embodiment of the invention, the control logic 54 includes a database management module 56, a URL analyzer module 58, a spoof site monitor module 60, and a spoof page "fingerprint" analyzer 62.

The communications module 52 may facilitate the exchange (e.g., transmitting and receiving) of data between the fraud tracking server and the various components that are external to the fraud tracking system 12, including (but not limited to): the client devices 16, the Internet servers 18, the administrative computer 24, the eCommerce servers 22, email servers (not shown), and various other components.

The communications module 52 may include a web server module 64, a URL extraction module 66, an intelligent email and report generating module 68, and an administrative module 70.

In one embodiment of the invention, the URL extraction module 66 of the communications module 52 extracts URLs from data messages received by the communications module 52. For example, the URL extraction module 66 may receive data in the form of email messages. The email messages may be in a standardized (or uniform) and structured format, or alternatively, the email messages may be in a non-standardized format. In either case, the URL extraction module 56 may extract a URL from the email message by analyzing the contents of the email message and performing a search for text representing a URL.

In addition to receiving data identifying a potential spoof site from an email, one exemplary embodiment of the invention may include the web server module 64 to receive data identifying a potential spoof site. For example, in one embodiment of the invention, the web server module 64 may facilitate the exchange of data with users and administrators. Accordingly, a user may submit suspicious URLs directly to the fraud tracking server by, for example, filling in one or more fields or forms of a web document. The web document may be hosted and served by the web server module 64 of the fraud tracking server 28.

In one embodiment of the invention, after a URL associated with a potential spoof site has been received, the database management module 56 of the control logic 54 may generate a record such as a spoof site tracking record for the suspicious URL and add the spoof site tracking record to the fraud tracking database 30. Each spoof site tracking record, an exemplary embodiment of which is described in greater detail below, may have various data fields, including a field to identify the suspicious URL.

In one embodiment of the invention, the control logic 54 may include the URL analyzer module 58. Accordingly, the URL analyzer module 58 may analyze each URL received by the communications module 52 to determine whether or not the URL is associated with a spoof site for which a spoof site tracking record already exists in the fraud tracking database 30. Accordingly, in one embodiment, instead of generating a spoof site tracking record every time a potential spoof site is reported, the URL analyzer module 58 may analyze the reported URL to determine whether it is associated with a known spoof site for which a record already exists. For example, a spoof site for the popular auction site, eBay.com, may have several documents with different URLs, such as: http://www.ibay.com/index.html and http://www.ibay.com/login.html. In one embodiment of the invention, if a spoof site tracking record already exists for the first URL (i.e., http://www.ibay.com/index.html), the URL analyzer module 58 may prevent a second spoof site tracking record from being generated for the second URL (i.e., http://www.ibay.com/login.html). For example, in one embodiment of the invention, a spoof site tracking record may be created only for unique sites, and not for each document that is part of the site. In one embodiment of the invention, the uniqueness of a site may be determined by the domain name of the server that is hosting or serving the documents. Alternatively, the uniqueness of a site may be determined by the IP address of the server hosting the site.

In one exemplary embodiment of the invention, the URL analyzer module 58 may go through a series of operations to iteratively manipulate or process the URL associated with the potential spoof site and then compare the URL with URLs that have already been reported and for which spoof site tracking records already exist. For example, the URL analyzer module 58 may discard a portion of the URL, such as the protocol (e.g., "http:", "https:" or "ftp:"), before making a comparison with URLs that are from known spoof sites. Next, the URL analyzer module 58 might discard the pathname of the file, and so on, until all that is left is the domain name from the URL. If the URL is associated with a spoof site for which no spoof site tracking record exists, then the control logic 54 may generate a new spoof site tracking record and add it to the fraud tracking database 30.

In one embodiment of the invention, either before or during the generation of the spoof site tracking record, the control logic 54 of the fraud tracking server 28 may automatically retrieve the document (e.g., the source code such as the HTML code of a web page) associated with the URL and add it to the spoof site tracking record. In addition, the control logic 54 may automatically download and store a screenshot of the document. Alternatively, the control logic 54 may automatically download the source code and screenshot after the spoof site tracking record has been generated, and then update the spoof site tracking record with the downloaded source code and screenshot. In an alternative embodiment, an administrator may manually update the spoof site tracking record by downloading the source code and screenshot of the document and storing them as part of the spoof site tracking record.

After generating a spoof site tracking record associated with the URL of the potential spoof site, the control logic 54 may cause the communications module 52 to communicate the URL associated with the potential spoof site to an administrator for review and verification. Accordingly, the communications module 52 includes an administrative module 70 that may facilitate the administration functions of the fraud tracking server 28, including the reporting of URLs associated with potential spoof sites to an administrator. In addition, the administrative module 70 may operate in conjunction with the web server module 64 to allow an administrator to access and administer the fraud tracking server 28 remotely via a web browser application. For example, the administrative module 70 may include several administrative web documents that facilitate a web interface to the fraud tracking server 28. By downloading and interacting with the web documents via a web browser application, an administrator can perform administrative tasks, such as (but not limited to): retrieving information about potential spoof sites; managing (e.g., adding, updating, and/or deleting) spoof site tracking records; configuring the fraud tracking server; and various other administrative tasks.

In one embodiment of the invention, the exemplary email, sent by the fraud tracking server 28 to the administrator to notify the administrator of a potential spoof site, may include a hypertext link to a document hosted by the fraud tracking server 28 that includes data from the spoof site tracking record. By selecting the hypertext link, the administrator can download and view information about the URL that has been reported. In addition, the email sent from the administrative module 70 of the fraud tracking server 28 to the administrator may include the actual URL that was reported as suspicious. Accordingly, the administrator may download and view the document associated with the URL to verify whether the potential spoof site is an actual spoof site. After the administrator has determined that the potential spoof site is an actual spoof site, the administrator may interact with the administrative module 70 to update the spoof site tracking record to indicate that the URL is associated with an actual spoof site. Alternatively, if the administrator determines that the document associated with the suspicious URL is in fact a legitimate document from a legitimate site operated by the online enterprise, then the administrator may update the spoof site tracking record to indicate that the URL is associated with a legitimate document by updating a status field of the tracking record to "cancelled" or "suspended."

The communications module 52 may also include the intelligent email and reporting module 68. The intelligent email and reporting module 68 may automatically generate emails and reports for various purposes. For example, after the fraud tracking server 28 has received verification from the administrator that the potential spoof site is an actual spoof site, the intelligent email and reporting module may automatically generate an email, or letter, to the ISP associated with the IP address of the server that is hosting the actual spoof site. In one embodiment of the invention, the intelligent email and reporting module 68 automatically analyzes the IP address of the server that is hosting the actual spoof site to determine the ISP associated with the IP address. Once the ISP has been determined, the reporting module 68 may automatically generate an email, letter, or any other communication properly addressed to the corresponding ISP. In one embodiment, the intelligent email and reporting module 68 automatically tailors the contents of the email, or letter, by selecting the language of the email, or letter, based on the location of the ISP, and changing the contents of the letter based on whether or not a previous letter has already been sent. Thus, the intelligent email and reporting module 68 may include a plurality of different reporting documents providing predetermined content in many different languages.

In one exemplary embodiment of the present invention, the intelligent email and reporting module 68 includes a report generation feature. For example, an administrator may use the intelligent email and report generating module 68 to generate reports, including data from one or more spoof site tracking records. For example, the reports may be used to assist law enforcement officials in their data and evidence gathering tasks.

In one embodiment of the invention, the control logic 54 includes the spoof site monitor module 60 to monitor (intermittently or continuously) whether a spoof site is still active, after it has been reported and verified. For example, the spoof site monitor module 60 may periodically attempt to download the document associated with the URL in the spoof site tracking record. If the spoof site monitor module 60 successfully downloads the document, then the spoof site monitor module 60 may update the spoof site tracking record to indicate the date and time at which the document was last downloaded successfully. If, however, the spoof site monitoring fails to download the document associated with a URL in a spoof site tracking record, then the spoof site monitor module 60 may update the spoof site tracking record accordingly, and trigger a notice to an administrator to verify that the spoof site has been removed. In one embodiment, in addition to determining whether the document associated with the URL is still available, the spoof site monitor 60 may compare an available document to a copy of the document stored in the spoof site tracking record to determine whether the document has been modified. In one embodiment, even after the ISP has removed a spoof site, the spoof site monitor module 60 may periodically check (e.g., on a monthly basis for a number of months after the spoof site is removed) to check if the spoof site has reappeared.

In one embodiment of the invention, the control logic 54 also may include a spoof page "fingerprint" analyzer module 62. The analyzer module 62 may analyze an Internet document (e.g., an HTML document) to determine unique characteristics of the document. Based on the characteristics of the document, the analyzer module 62 may assign the document a unique identifier. For example, the analyzer module 62 may assign an identifier to a document based on an analysis of its source code (e.g., HTML code). Then, when a new Internet document is analyzed, the identifier of previously identified documents may be compared to the identifier assigned to the new document. If the identifiers match, then there is a high probability that the source of the documents, for example the author, is the same. In this way, the online enterprise can attempt to identify the source (e.g., the author) of new spoof sites, based on an analysis of previously identified spoof pages.

In one embodiment of the invention, the fraud tracking server 28 may also include a toolbar application server 72. The toolbar application server 72 may work in conjunction with various client security applications that execute, for example, on the client devices 16. For example, in one embodiment of the invention, a client security application, in the form of a toolbar, may operate in conjunction with a web browser application on one of the client devices 16. When a user browses Internet documents provided by the Internet servers 18, if the user views a suspicious document, the toolbar provides various security features to the user. If the user suspects the document (e.g., web page) as being a spoofed or fraudulent page, the user may report this to the fraud tracking system 12 using the toolbar (e.g., clicking on a link or icon). In one embodiment, the client security application may include an indicator that notifies the user whether the URL of the document that is being viewed is trusted or not. In one embodiment of the invention, a trusted URL may be placed on a "white list" while URLs associated with known spoof sites are placed on a "black list." The black list may be stored as a record in the fraud tracking database 30, and automatically updated by the fraud tracking system 12.

In one embodiment of the invention, the toolbar application server 72 may include a black list updater module 74. The black list updater module 74 may automatically update a black list by adding or deleting from the black list URLs that an administrator has verified as either being associated with known spoof sites, or as legitimate. Consequently, the client security application's black list may be updated automatically and immediately, after an administrator has verified that a reported URL is associated with an actual spoof site, or alternatively, after an administrator has verified that the reported URL is legitimate.

Another feature of the toolbar application server 72 is a query tool. For one embodiment of the invention, a client security application allows a user of a client device 16, or an administrator, to perform a quick query of the fraud tracking database 30. For example, a client security application, in the form of a toolbar, may allow a user to simply select a button or link on the toolbar to query the fraud tracking database 30 to determine whether the URL of a document that is currently loaded in the user's browser has a corresponding spoof site tracking record in the fraud tracking database 30. If, for example, an administrator loads a document in a web browser application, and the administrator believes the document to be associated with a spoof site, the administrator can use the client security application to quickly query the fraud tracking database 30 for information related to the URL of the document the administrator is viewing. If a spoof site tracking record exists for the URL, then the administrator can update, or edit, the record. However, if no spoof site tracking record exists, the administrator can quickly add a spoof site tracking record to the fraud tracking database 30 for the URL.

It will be appreciated that the various functional modules shown in FIG. 3 may vary from one embodiment to the next. For example, some embodiments may omit one or more of the modules while other embodiments may include additional modules. Furthermore, the various functional components/modules may be arranged in various different groups or not grouped at all. For example, the URL extraction module 66 need not be part of the communications module 52 but may be provided elsewhere, for example, on a different server.

Figure 4:
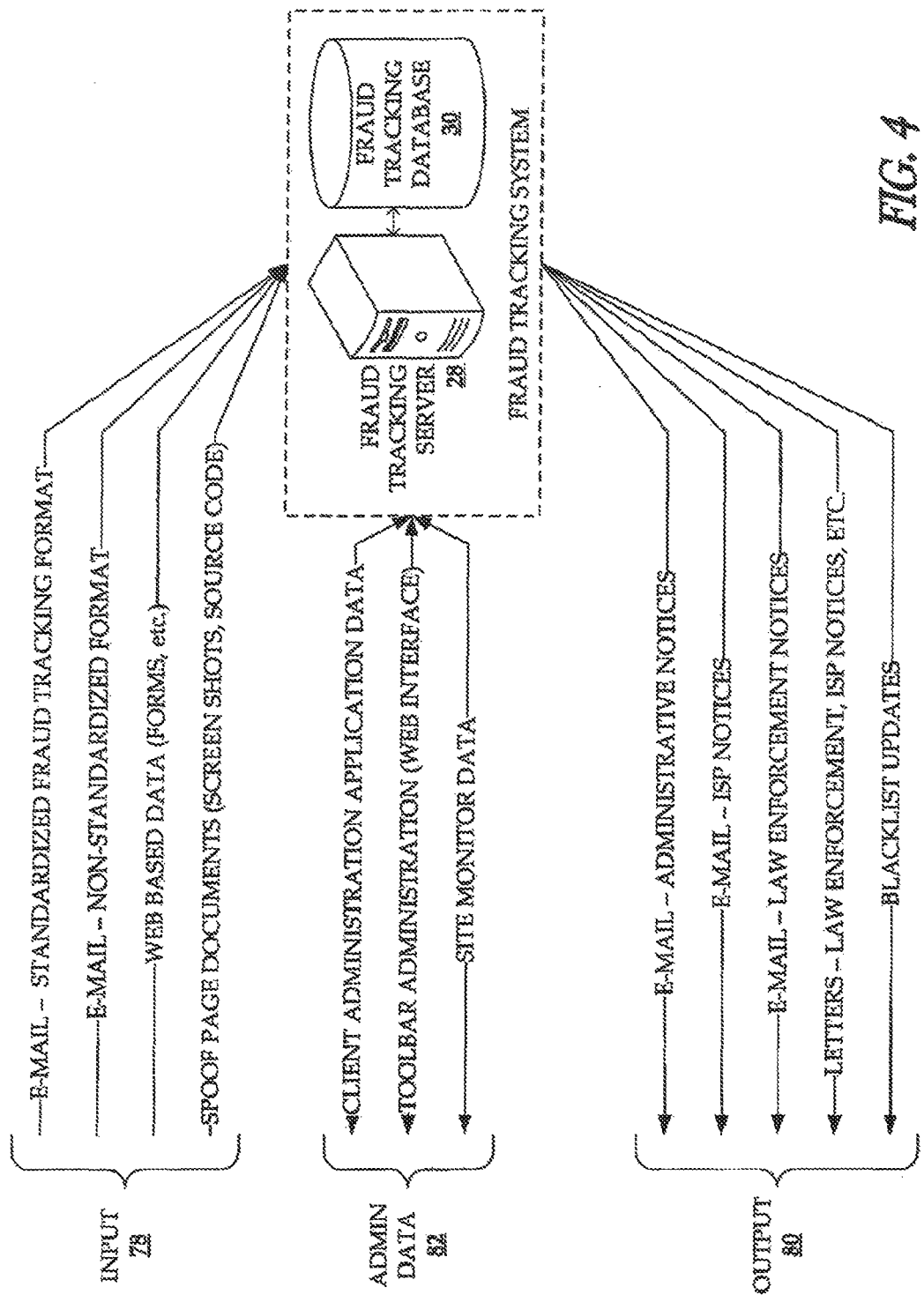
FIG. 4 illustrates various inputs and outputs for one exemplary embodiment of a fraud tracking server, in accordance with the invention.

FIG. 4 illustrates the various exemplary inputs 78 and outputs 80 for one embodiment of the fraud tracking server 28. For example, as illustrated in FIG. 4, in one embodiment the fraud tracking server 28 receives data associated with a potential spoof site in the form of an email that may or may not be in a standardized format. In addition, the fraud tracking server 28 may receive data via a web server module 64. For example, an administrator may fill out forms on an Internet document hosted by the fraud tracking server 28 and submit the forms to the fraud tracking server 28. FIG. 4 also illustrates the various exemplary outputs 80 of one embodiment of the fraud tracking server 28, which include (but are not limited to): emails to administrators; emails to ISPs; emails to law enforcement; letters to ISPs and/or law enforcement; and black list updates. Finally, FIG. 4 illustrates some exemplary administrative data that is exchanged between the fraud tracking server 28 and various other components. For example, administrative data may include (but not be limited to): client administrative application data, such as configuration information; toolbar application data; and data generated by the spoof site monitor 60.

FIG. 5 illustrates an example, of one exemplary embodiment of the invention, of a spoof site tracking record 84. As illustrated in FIG. 5, the exemplary spoof site tracking record 84 may include fields for any of the following data:

| DATA FIELD | DESCRIPTION |
| --- | --- |
| SPOOF URL 86 | A universal resource locator for a document associated with the spoof site. |
| IP ADDRESS 88 | The Internet Protocol address of the server that is hosting the document identified by the spoof URL. |
| ISP CONTACT INFORMATION 90 | The contact information, including address, of the ISP associated with the IP address. |
| DATE REPORTED 92 | The date the spoof site was first reported. |
| DATE VERIFIED 94 | The date an administrator first verified the existence of the spoof site. |
| COPY OF SOURCE CODE 96 | A copy of the source code (e.g., HTML) of the document associated with the spoof URL. |
| SCREENSHOT 98 | A screen capture image of the document. |
| DATE FIRST "TAKE DOWN NOTICE" SENT 100 | The date that a first communication (e.g., letter or email) was sent to the ISP requesting that the spoof site be removed. |
| DATE SECOND "TAKE DOWN NOTICE" SENT 102 | The date that a second letter, if appropriate, was sent to the ISP requesting that the spoof site is removed. |
| CASE NOTES 104 | Notes that an administrator that works the case may like to make available to all administrators. |
| RESPONSE FROM ISP 104 | Any response from the ISP that is associated with the IP address. |
| LOGS FROM ISP 106 | Any activity logs from the ISP relating to the spoof site. |

Figure 6:
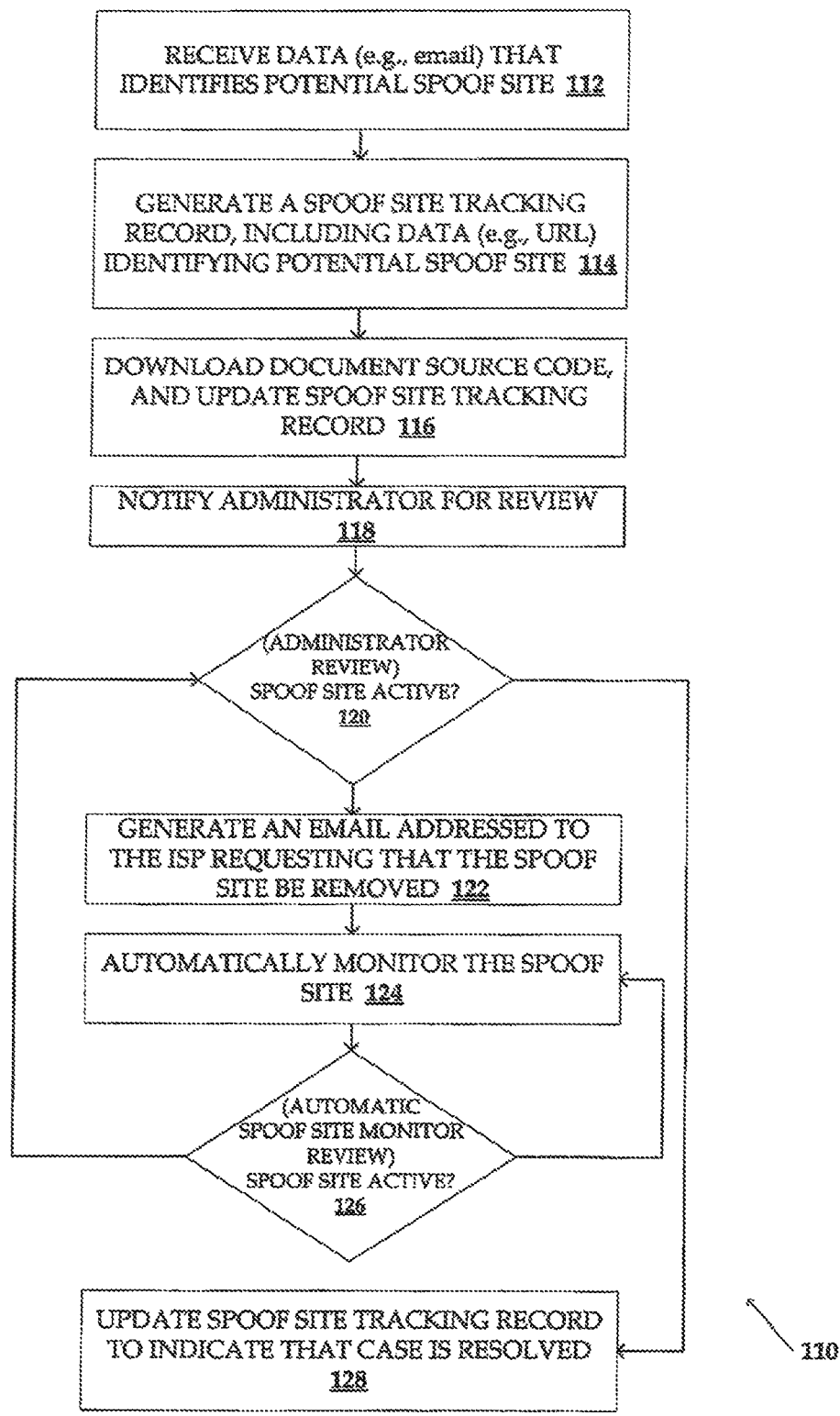
FIG. 6 illustrates exemplary operations of a method, in accordance with one embodiment of the invention, of tracking a spoof site.

FIG. 6 illustrates exemplary operations performed in a method 110, in accordance with one embodiment of the invention, for tracking a spoof site. Although the method 100 is described with reference to the fraud tracking server 28, it will be appreciated that it may be applied in any computing environment. At operation 112, the fraud tracking server 28 receives data identifying a potential spoof site. In one embodiment of the invention, the data is a URL that is automatically extracted, by the URL extraction module 66 (see FIG. 3) from an email received by the communications module 52. In an alternative embodiment, the data may be entered in a web document hosted and served by the web server module 64 of the fraud tracking server 28. In either case, at operation 114, an exemplary spoof site tracking record 84 is generated and stored in the fraud tracking database 30. However, in one embodiment of the invention, a spoof site tracking record is generated only if the URL analyzer module 58 determines that the reported URL is not associated with a spoof site that has already been reported and for which a spoof site tracking record 84 already exists.

At operation 116, the source code of the document associated with the URL is automatically downloaded and the spoof site tracking record 84 is updated to include the source code. In one embodiment of the invention, in addition to downloading the source code, a screen shot of the actual document, or web page, is captured and stored with the spoof site tracking record 84. Furthermore, in one exemplary embodiment of the invention, the downloading operation 116 occurs automatically in response to receiving verification from the administrator that the URL is associated with an actual spoof site. In an alternative embodiment of the invention, the downloading operation 116 may be performed manually by the administrator, for example, at the time the administrator views the document to verify that the potential spoof site is in fact an actual spoof site.

At operation 118, the fraud tracking server 28 notifies an administrator that a potential spoof site has been reported and that a spoof site tracking record has been generated. In one embodiment of the invention, the notification is an email sent to the administrator. In an alternative embodiment, the notification may simply be a visual indicator on an administrative interface of the fraud tracking server 28. It will be appreciated that potential spoof sites may be displayed as lists, be tabulated, or displayed and communicated to an administrator in any convenient fashion. In any case, at operation 120, the administrator may review the document associated with the reported URL to determine whether the document is associated with an actual spoof site. If the administrator determines that the potential spoof site is not an actual spoof site, then the administrator may, at operation 128, update the spoof site tracking record 84 to indicate the case is closed, or resolved. It will however be appreciated that the administrator need not be notified and that the fraud tracking server may, in one embodiment, operate in a totally automated fashion without human intervention. For example, communications may be sent automatically to an ISP or any other party facilitating the existence of the spoof site.

However, if at operation 120 the administrator determines that the potential spoof site is an actual spoof site, then at operation 122 the fraud tracking server 28 automatically generates a communication such as an email addressed to a hosting party such as the ISP associated with the IP address of the server that served the document. For example, in one embodiment of the invention, the email may request that the ISP take action to remove the spoof site. In one embodiment of the invention, the fraud tracking server 28 can customize the email message by, for example, selecting a language that corresponds to the location (e.g., country) where the ISP is located. In addition, the content of the email may be customized to properly address the problem based on the legal requirements of the particular jurisdiction in which the ISP falls. In an alternative embodiment of the invention, rather than generating an email, the fraud tracking server 28 generates a letter.

After the ISP has been notified of the spoof site, at operation 124 the fraud tracking server 28 may begin monitoring the spoof site to determine whether it remains active. For example, in one embodiment of the invention, the fraud tracking server will periodically attempt to download the document identified by the URL in the spoof site tracking record, and compare it to the downloaded source code that is stored in the spoof site tracking record. If the document is successfully downloaded and matches the stored document, then the fraud tracking server 28 may update the spoof site tracking record to indicate that the spoof site is still active. If the spoof site continues to remain active then the fraud tracking system 28 may continue to monitor the site at selected time intervals.

If, however, the document does not successfully download and/or is not the same as the document on record in the spoof site tracking record, then the fraud tracking server 28 may update the spoof site tracking record 84 accordingly and notify an administrator that the document needs to be reviewed. If, after reviewing the document at operation 120, the administrator determines that the spoof site has been removed, the administrator may update the spoof site tracking record 84 at operation 128 to indicate that the case has been resolved. In one embodiment of the invention, even after a case has been resolved, the spoof site monitoring module 60 may periodically revisit the URL to determine whether the site is once again active, and if so, notify an administrator. Furthermore, in one embodiment of the invention, during the automatic monitoring, the spoof site monitor may automatically resolve some cases. For example, in some cases (e.g., when a "404, document not found" error occurs), the spoof site monitoring module 60 may automatically update the spoof site tracking record accordingly.

Figure 7:
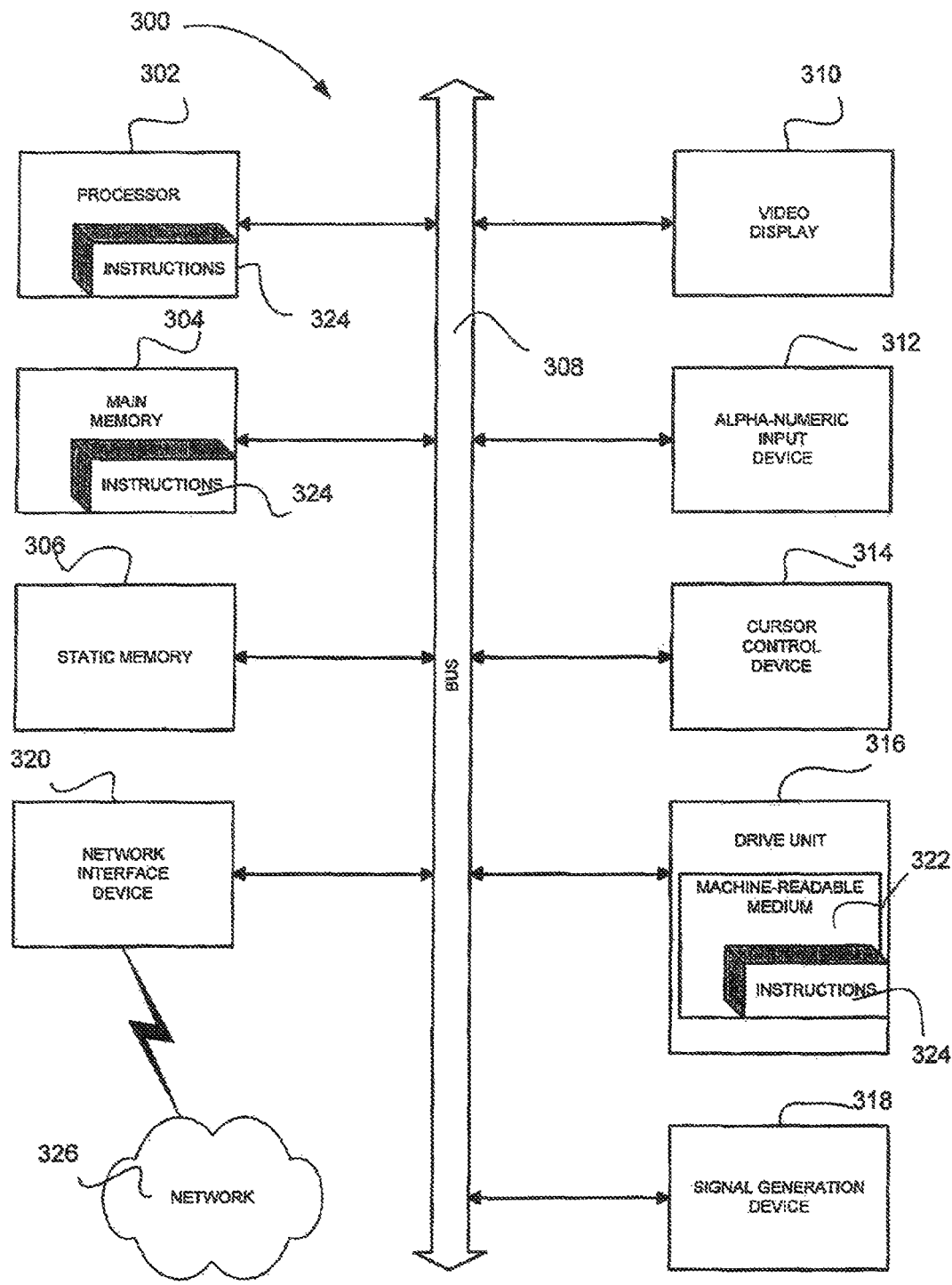
FIG. 7 shows a diagrammatic representation of a machine in the exemplary form of a computer system, within which a set of instructions, for causing the machine to perform any one or more of the methodologies discussed herein, may be executed.

FIG. 7 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although the present invention has been described in the context of tracking spoof sites, it will be appreciated that the present invention may have many other practical applications. For example, the present invention may be utilized to track and monitor web sites that fall within any predefined category, including web sites that are generally associated with other illegal activities. For example, law enforcement officials might utilize an embodiment of the present invention to track web sites utilized for illegal drug trafficking, terrorist activities, and/or child pornography.

Thus, a method and system for tracking fraudulent activities have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system for tracking potentially fraudulent activity, the system including:
   a fraud tracking database; and
   a fraud tracking server connected to the fraud tracking database, the fraud tracking server including:
      a memory having instructions embodied thereon;
      one or more processors coupled to the memory and configured by the instructions to perform operations comprising:
         receiving data identifying a spoof site;
         generating a spoof site tracking record stored in the fraud tracking database, the spoof site tracking record including the data identifying the spoof site;
         retrieving a first document from the spoof site;
         storing contents of the first document in the spoof site tracking record;
         automatically monitoring the spoof site to determine whether the spoof site is still active by periodically attempting to access the document associated with the spoof site;
         comparing contents of a document retrieved during the automatic monitoring with the stored contents of the first document; and based on a result of the comparison, updating the spoof site tracking record by adding to the spoof site tracking record data indicating whether or not the first document was still accessible during the automatic monitoring.

2. The system of claim 1, wherein the data identifying the spoof site is a URL identifying a document associated with the spoof site, and the one or more processors are further configured to extract the URL from an email.

3. The system of claim 2, wherein the operations further comprise automatically communicating the URL extracted from the email to an administrator.

4. The system of claim 3, wherein the operations further comprise:
receiving verification from the administrator that the spoof site is an actual spoof site; and
automatically updating the spoof site tracking record with data associated with the actual spoof site.

5. The system of claim 4, wherein the verification received from the administrator indicates that the administrator has viewed the spoof site and determined that the spoof site is an actual spoof site.

6. The system of claim 4, wherein the operations further comprise automatically retrieving data associated with the actual spoof site based on the administrative module receiving the verification from the administrator that the spoof site is the actual spoof site.

7. The system of claim 4, wherein the one or more processors are further configured to:
analyze an IP address of a server hosting the spoof site to determine an ISP associated with the IP address; and
automatically generate an email addressed to the ISP associated with the IP address, the email notifying the ISP of the spoof site and requesting the ISP to take action to remove the spoof site.

8. The system of claim 2, wherein the operations further comprise analyzing the URL identifying the document to determine whether the URL is associated with a previously identified spoof site for which a spoof site tracking record already exists.

9. The system of claim 1, wherein the operations further comprise:
updating the spoof site tracking with data indicating a time of the last attempt to access the first document.

10. The system of claim 1, wherein the analysis of the contents of the document comprises an analysis of source code of the document.

11. The system of claim 1, wherein the operations further comprise:
responsive to a determination that the first document was not still accessible during the automatic monitoring, notifying an administrator that the first document needs to be reviewed.

12. A method comprising:
receiving data identifying a spoof site;
generating, by a processor of a machine, a spoof site tracking record stored in a fraud tracking database, the spoof site tracking record including the data identifying the spoof site;
retrieving a first document from the spoof site;
storing contents of the first document in the spoof site tracking record;
automatically monitoring, by the processor of the machine, the spoof site to determine whether the spoof site is still active by periodically attempting to access the document associated with the spoof site;
comparing contents of a document retrieved during the automatic monitoring with the stored contents of the first document; and
based on a result of the comparison, updating the spoof site tracking record by adding to the spoof site tracking record data indicating whether or not the first document was still accessible during the automatic monitoring of the actual spoof site.

13. The method of claim 12, further comprising:
responsive to receiving verification that the spoof site is an actual spoof site, retrieving data associated with the actual spoof site; and,
updating the spoof site tracking record with the retrieved data associated with the actual spoof site.

14. The method of claim 13, wherein the verification is received from an administrator who has viewed the spoof site and identified the spoof site as an actual spoof site.

15. The method of claim 13, wherein retrieving data associated with the actual spoof site occurs automatically based on verification being received that the spoof site is an actual spoof site.

16. The method of claim 13, further comprising:
analyzing the IP address of the server hosting the spoof site to determine an ISP associated with the IP address; and
generating an email addressed to the ISP associated with the IP address, the email notifying the ISP of the spoof site and requesting the ISP to take action to remove the spoof site.

17. The method of claim 16, wherein analyzing the IP address of the server hosting the spoof site and generating an email addressed to the ISP associated with the IP address occur automatically in response to receiving verification that the spoof site is an actual spoof site.

18. A non-transitory machine-readable medium storing a set of instructions that, when executed by the machine, cause the machine to perform operations comprising:
receiving data identifying a spoof site;
generating a spoof site tracking record in a fraud tracking database, the spoof site tracking record including the data identifying the spoof site;
retrieving a first document from the spoof site;
storing contents of the first document in the spoof site tracking record;
automatically monitoring the actual spoof site to determine whether the spoof site is still active by periodically attempting to access the document associated with the spoof site;
comparing contents of a document retrieved during the automatic monitoring with the stored contents of the first document; and
based on a result of the comparison, updating the spoof site tracking record by adding to the spoof site tracking record data indicating whether or not the first document was still accessible during the automatic monitoring.

19. The non-transitory machine-readable medium of claim 18, wherein:
the data identifying a potential spoof site is a URL identifying a document associated with the spoof site;
the receiving of the data receives the data in an email; and
the operations further comprise extracting the URL from the email.

20. The non-transitory machine-readable medium of claim 19, wherein the operations further comprise automatically communicating the URL extracted from the email to an administrator.

* * * * *